July 10, 1956
T. ONGARO
2,753,948
FILTERING CELL PROD FOR VIBRATORY PICK-UP DEVICES
Filed Sept. 29, 1952
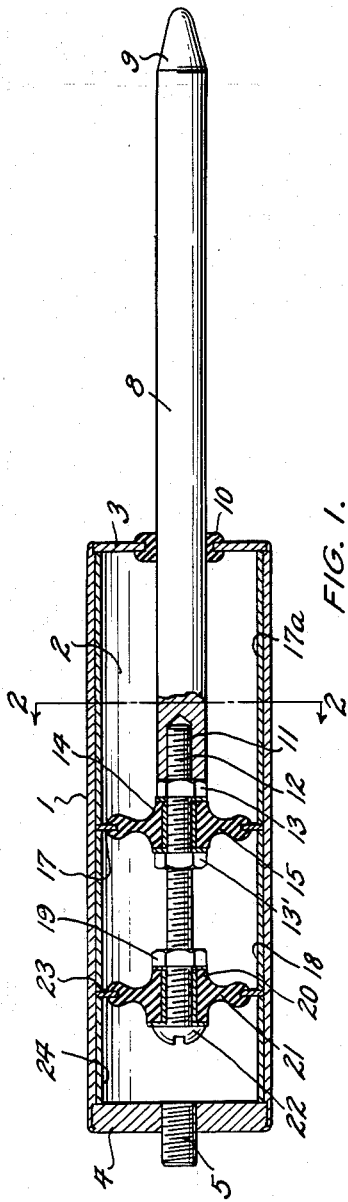
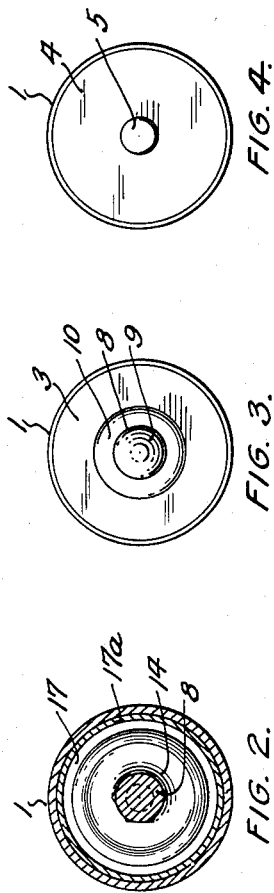
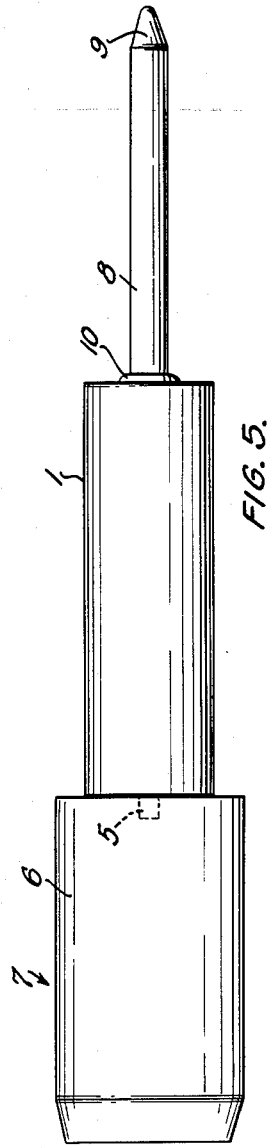
INVENTOR
Theodore Ongaro
BY *W. N. McDowell*
ATTORNEY

United States Patent Office 2,753,948
Patented July 10, 1956

2,753,948

FILTERING CELL PROD FOR VIBRATORY PICK-UP DEVICES

Theodore Ongaro, Columbus, Ohio, assignor to International Research and Development Corporation, Columbus, Ohio, a corporation of Ohio Application September 29, 1952, Serial No. 312,022

2 Claims. (Cl. 181—33)

This invention has reference to vibration-detecting and transmitting apparatus, and has particular reference to an improved vibration conducting prod device for use in association with current-generating pick-up instruments in which mechanically induced vibration is translated into electrical energy and the resulting current impulses amplified for recording or registering purposes, whereby to analyze machine-produced vibratory motion and to assist in its detection and correction.

It is an object of the present invention to provide a vibration-detecting and transmitting prod for pick-up instruments which is so formed as to suppress or minimize the transmission of vibrations of undesired frequency to the pick-up instrument and to transmit vibrations which possess frequencies best suited to electrical development by the pick-up instrument.

In accordance with the present invention, a filtering prod for pick-up instruments is provided which is so designed as to make possible the study and analysis of relatively low-frequency vibrations. Such vibrations are often contaminated with high-frequency components or harmonics; for example, those existing in the study and analysis of vibratory forces or impulses produced through the operation of electric motors. The filtering prod of the present invention is essentially a mechanical device for substantially increasing the attenuation ratio existing between high and low frequency components of the input vibratory energy delivered by the prod to the pick-up instrument. Further, and in accordance with the present invention, a prod is provided which is yieldably suspended in an outer case by means of resilient diaphragms. The prod is adapted to have its stylus member placed in contact with a work piece to be studied, so that vibrations present in the work piece are transmitted through the stylus member to the case-mounted resilient diaphragms in which the member is suspended. The diaphragms are so constructed and arranged that the same serve in the capacity of an attenuator means to resist transmission in the case of undesired high-frequency components, while transmitting almost without loss the low-frequency components. Thus, the prod makes possible the study and analysis of vibrations in wide fields of activity which have been investigated heretofore only with the use of relatively large and expensive electronic filters, it being one of the primary objects of the present invention to provide a simple, rugged yet sensitive filter prod which may be roughly or carelessly handled by those using the same without injury, and which will transmit only the desired low-frequency vibrations to associated detecting and analyzing apparatus.

For a further understanding of the invention, reference is to be had to the following description and the accompanying drawings, wherein:

Fig. 1 is a view in vertical longitudinal section of a vibration pick-up filter prod when the same is formed in accordance with the present invention;

Fig. 2 is a vertical transverse sectional view taken through the prod on the plane indicated by the line 2—2 of Fig. 1;

Fig. 3 is an end elevational view of the prod;

Fig. 4 is a similar view looking toward the opposite end of the prod;

Fig. 5 is a view in side elevation disclosing the prod when carried by a vibration pick-up instrument.

Referring more particularly to the drawings, the numeral 1 designates a cylindrical case of the filter prod forming the present invention, the case including an internal chamber 2, which is closed at its front end by means of a transverse end wall 3 and at its rear end by another wall 4. If desired, the center of the wall 4 may be provided with an exteriorly projecting threaded stud 5. By means of the stud the prod, as shown in Fig. 5, may be joined in vibration-transmitting relationship with the front end of the casing or housing 6 of a pick-up instrument 7, the latter being preferably of the type disclosed in my companion application S. N. 312,021, executed of even date herewith.

Positioned in the case 1 and extending forwardly and longitudinally in axial relation therefrom, is a vibration-detecting and transmitting stylus 8. The front of this stylus is tapered as at 9 for contact with vibratory bodies. Intermediately of its length the stylus is positioned in a grommet or eyelet 10, the latter being carried by the front wall 3 of the case 1 and formed from a yieldable or resilient material, such as vulcanized natural or synthetic rubber. The rubber or other similar resilient material from which the grommet is formed serves to prevent undesired transmission of certain types of vibratory motion to the case of the prod.

At its rear end the stylus 8 terminates in a face having an internal threaded socket 11. This socket is adapted to receive one end of a screw 12 which projects rearwardly and axially from the stylus 8. The screw 12 carries a position-controlling nut 13 which engages the front face of the hub 14 of a forward diaphragm 15, the latter also being formed from rubber or other similar resilient material. The diaphragm is retained on the screw 12 by a second rearwardly positioned nut 13′ which engages the rear end of the hub 14 and cooperates with the nut 13 in maintaining the longitudinal adjustment of the diaphragm on the stylus 8 of which the screw 12 forms a component part.

The outer peripheral portion of the diaphragm 15 is formed with a circumferential groove in which is seated a metallic ring 17, forming a part of the diaphragm 15. The ring 17 is located between the adjoining faces of forwardly and intermediately positioned spacing sleeves indicated at 17a and 18, respectively.

To further stabilize the construction of and support for the case-received end of the stylus, the rear end of the screw 12 is provided with a third nut indicated at 19, which engages the forward face of the hub 20 of a second rearwardly disposed diaphragm 21. This diaphragm is of the same construction and formed from the same material as the forward diaphragm 15, and is retained on the rear end of the screw 12 by the enlarged and slotted head 22 of said screw. The peripheral portion of the diaphragm 21 carries a ring 23 which is positioned between the adjoining faces of the intermediate sleeve 18 and a rearwardly disposed sleeve 24 arranged within the case. The rear wall 4 is threadedly carried by the end of the case 1 so that when said rear wall is tightened into its operative position closing the rear end of the case, the spacer sleeves 17a, 18 and 24 will be retained in their operative positions holding the circumferential portions of the diaphragms 15 and 21 against displacement, and providing for the transmission of vibrations of predetermined value to the outer wall of the case 1.

The filter prod of the present invention, constructed as shown in the drawings and as above described, makes possible the study, detection and analysis of relatively low-frequency vibrations that are often so frequently commingled with other high-frequency components or harmonics as to make the reading thereof difficult to decipher. The mechanical filtering of such vibration provided by the prod of the present invention greatly increases the attenuation ratio between the high and low-frequency components of the vibratory forces imparted to the case 1 by the stylus member of the prod. It will be noted that the stylus is suspended, as it were, from the outer cylindrical wall of the case by means of the resilient diaphragms indicated at 15 and 21. As previously stated, these diaphragms may be composed of rubber, either natural or synthetic, or other materials having similar properties, such as steel, or the same may be designed for fluid cushioning. In use, the stylus of the prod is placed in contact with a vibratory workpiece to be studied, and the vibration existing in the work piece is transmitted through the stylus to the resilient diaphragms. These diaphragms, when properly designed, and with due consideration given to the time constant of the system, serve as an attenuating means to the high-frequency components of the transmitted vibrations, filtering out such high-frquency compoennts while at the same time transmitting almost without loss the low-frequency components. Thus, the prod makes ppossible the study and analysis of vibrations in a wide field of activity, particularly fields which have only been open heretofore with the use of large and expensive electronic filters. The prod is particularly useful in delivering vibratory forces of predetermined frequency through pick-up and amplifying devices of the type disclosed in my aforesaid companion patent application. Where it is not necessary to filter the frequencies, the stylus is adapted to be directly connected to the case in order to by-pass the resilient diaphragms.

I claim:

1. A frequency-filtering cell for use with pick-up instruments of the type employed in translating mechanical vibratory motion into electrical values, said cell comprising a case formed with an internal chamber having a longitudinal axis, a longitudinally extending stylus having its longitudinal axis coincident with the longitudinal axis of the chamber and extending forwardly therefrom through an opening formed in the forward end wall, said stylus being formed from a relatively rigid motion-transmitting material, a resilient grommet positioned in the opening of said front wall and separating the stylus from the edge of said opening, a plurality of resilient diaphrams arranged in definitely spaced longitudinal order on the rear end of said stylus within said case for mechanically transmitting vibrations of predetermined value to said case, and means disposed within the internal chamber of said case for retaining the outer portions of said diaphragms in vibration-transmitting engagement with the case walls.

2. A frequency filtering cell for use with pick-up instruments of the type employed in translating mechanical vibratory motion into electrical values, said cell comprising a case formed with an internal chamber having a longitudinal axis, a longitudinally extending stylus having a longitudinal axis coincident with the longitudinal axis of the chamber and extending forwardly therefrom through an opening in the forward end wall of said chamber, a plurality of resilient suspension means arranged in longitudinally spaced positions on the portion of the stylus within the case, means disposed within the internal chamber of the case for retaining the outer portion of said suspension means in vibration transmitting engagement with the case walls, and connecting means on the end of said case adjacent the case enclosed end of said stylus for connecting said case in vibration transmitting engagement with a pick-up for translating mechanical vibratory motion into electrical values, said connecting means being accessible from the outside of said case.

References Cited in the file of this patent

UNITED STATES PATENTS

| 1,658,327 | Dodge | Feb. 7, 1928 |
| 1,702,456 | Trumpler | Feb. 19, 1929 |
| 2,596,048 | Severs | May 6, 1952 |

FOREIGN PATENTS

| 102,571 | Australia | Dec. 2, 1937 |
| 590,744 | Great Britain | July 28, 1947 |